(12) United States Patent
Sugiyama

(10) Patent No.: US 7,509,003 B2
(45) Date of Patent: Mar. 24, 2009

(54) OPTICAL WAVEGUIDE, OPTICAL DEVICE, AND MANUFACTURING METHOD OF THE OPTICAL WAVEGUIDE

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/589,183

(22) Filed: Oct. 30, 2006

(65) Prior Publication Data
US 2007/0297720 A1 Dec. 27, 2007

(30) Foreign Application Priority Data
Jun. 9, 2006 (JP) .............................. 2006-160951

(51) Int. Cl.
G02B 6/26 (2006.01)
G02B 6/10 (2006.01)
G02F 1/035 (2006.01)

(52) U.S. Cl. .............................. 385/32; 385/3; 385/130

(58) Field of Classification Search ........................ None
See application file for complete search history.

(56) References Cited

U.S. PATENT DOCUMENTS

| | | | |
|---|---|---|---|
| 4,810,049 A | | 3/1989 | Fischer et al. |
| 5,800,860 A | * | 9/1998 | Kilian et al. .............. 427/163.2 |
| 6,690,871 B2 | * | 2/2004 | Lee et al. ..................... 385/129 |
| 6,829,080 B2 | | 12/2004 | Morikawa et al. |
| 6,836,354 B2 | * | 12/2004 | Kato et al. ................... 359/332 |
| 2004/0184755 A1 | * | 9/2004 | Sugiyama et al. ........... 385/129 |

FOREIGN PATENT DOCUMENTS

| JP | 01-202702 | 8/1989 |
|---|---|---|
| JP | 7-20508 | 1/1995 |
| JP | 7-199238 | 8/1995 |
| JP | 2537800 | 3/1997 |
| JP | 2003-29307 | 1/2003 |

* cited by examiner

*Primary Examiner*—Omar Rojas
(74) *Attorney, Agent, or Firm*—Staas & Halsey LLP

(57) ABSTRACT

An optical waveguide has a diffusion area (optical waveguide) with a high refractive index formed by diffusing impurities on a substrate. The diffusion area has a bent portion, and the optical waveguide includes: a groove formed by cutting the substrate along the diffusion area on the outside of the bent portion of the diffusion area; and a first buffer layer disposed on the upper portion of the diffusion area, having a refractive index equal to or higher than the refractive index of the substrate. The optical waveguide includes a second buffer layer having a refractive index equal to or lower than the refractive index of the substrate on the upper portion of the first buffer layer, and the second buffer layer is formed including contact with a side face of the groove.

21 Claims, 9 Drawing Sheets

OPTICAL WAVEGUIDE, OPTICAL DEVICE, AND MANUFACTURING METHOD OF THE OPTICAL WAVEGUIDE

CROSS-REFERENCE TO RELATED APPLICATIONS

This application is based upon and claims the benefit of priority from the prior Japanese Patent Application No. 2006-160951, filed on Jun. 9, 2006, the entire contents of which are incorporated herein by reference.

BACKGROUND OF THE INVENTION

1. Field of the Invention

The present invention relates to a technology of an optical waveguide used in an optical communication.

2. Description of the Related Art

An optical waveguide used in an optical modulator, etc. is formed by using a dielectric substrate (electro-optic crystal) such as a lithium niobate (LN; $LiNbO_3$) substrate and a lithium tantalate ($LiTaO_2$) substrate and by forming and thermally diffusing a film of metal such as titanium (Ti) on a portion of this substrate or performing proton exchange in benzoic acid after patterning. Optical modulation can be performed by disposing electrodes near the optical waveguide to apply a voltage. The light propagating through the waveguide tends to be absorbed by the electrodes, and a buffer layer is disposed between the LN substrate and the electrode to prevent the absorption. silicon oxide ($SiO_2$) with a thickness of 0.2 micrometers (μm) to 1 μm is used for the buffer layer.

To miniaturize the optical modulator, or to form a long optical waveguide within one chip, straight optical waveguides are used in combination with bent optical waveguides. By bending the optical waveguide, the straight optical waveguide can be formed into a bent shape and miniaturized.

FIG. 9A is a plan view of a conventional bent waveguide and FIG. 9B is a cross-section of the conventional bent waveguide. On a substrate (LN substrate) 500 at a bent portion, a groove 505 is formed on the outside of an optical waveguide 502 bent with a curvature radius R to prevent the optical loss due to radiation from the optical waveguide 502 of the bent portion (for example, Japanese Registered Utility Model Publication No. 2537800). The optical waveguide 502 can be formed by diffusing Ti as described above. A reference numeral 503 represents a buffer layer formed on the substrate 500.

FIG. 10A is a plan view of another conventional bent waveguide and FIG. 10B is a cross-section of another conventional bent waveguide. On the substrate 500 at the bent portion, a convex ridge portion 506 is disposed by forming the groove on the inside and outside of the optical waveguide 502, and the optical waveguide 502 is formed in the ridge portion 506. Such ridge portion 506 enhances confinement of the light within the optical waveguide 502, thereby reducing the optical loss at the bent portion.

In some cases, the buffer layer 503 is formed with a material having a refractive index at the same level as or higher than that of the substrate 500. By increasing an amount of light leaking into the buffer layer 503, the confinement can be enhanced. Other materials of the buffer layer 503 include titanium oxide ($TiO_2$), etc. The refractive index of $TiO_2$ is approximately 2.3, which is higher than that of the LN substrate 500. With the optical waveguide using $TiO_2$, a mode size, i.e., a waveguide mode size of fundamental wave propagating through the optical waveguide can be adjusted to improve efficiency of the propagation of the light in the optical waveguide (for example, Japanese Patent Laid-Open Publication Nos. H7-20508, H7-199238, and 2003-29307).

However, an optical waveguide formed by diffusing Ti does not confine light sufficiently, therefore a large light loss occurs. If Ti is diffused from the surface of the substrate, the density thereof becomes the highest at the surface of the substrate and is gradually lowered as the depth of the substrate increases. Although a buffer layer of $SiO_2$ etc. is disposed on the surface, $SiO_2$ has a low refractive index, which is about 1.5 and less light leaks into the buffer layer. Therefore, the center of the light is away from the substrate surface, which has a high refractive index, resulting in poor confinement.

Therefore, if the buffer layer contacting the substrate is formed by using $TiO_2$ etc., which have a refractive index at the same level as or higher than that of the substrate, the light amount leaking into the buffer layer can be increased to enhance the confinement of the light. However, if this configuration is directly applied to the optical waveguide with grooves arranged along the sides, since a refractive index is increased on the side and bottom surfaces of the grooves, the light is confined poorly in the lateral direction. Therefore, the light loss increases.

In the case of an optical modulator, etc., which modulate light with electrodes disposed on the optical waveguide, if the buffer layer is made only of a film with a high refractive index such as $TiO_2$, a mode of the light extends over the electrodes and is absorbed by the electrodes, and the light loss increases.

SUMMARY OF THE INVENTION

It is an object of the present invention to at least solve the above problems in the conventional technologies.

An optical waveguide according to one aspect of the present invention has a bent portion including a diffusion area that is formed by diffusing impurity on a substrate and that has a high refractive index. The optical waveguide includes a groove formed by etching the substrate at a portion of the substrate corresponding to an outside of a bend of the bent portion along the diffusion area; and a first buffer layer arranged over the diffusion area, the first buffer layer having a refractive index equal to or higher than a refractive index of the substrate.

An optical device according to another aspect of the present invention includes a diffusion area that is formed by diffusing impurity on a substrate and that has a high refractive index; a groove formed by etching the substrate at a portion of the substrate corresponding to an outside of a bend of the bent portion along the diffusion area; and a first buffer layer arranged over the diffusion area, the first buffer layer having a refractive index equal to or higher than a refractive index of the substrate; and a signal electrode arranged on top of the diffusion area along the diffusion area.

A method according to still another aspect of the present invention is of manufacturing an optical waveguide that has a bent portion including a diffusion area that is formed by diffusing impurity on a substrate and that has a high refractive index. The method includes performing pattern formation of the diffusion area; forming a first buffer layer over the diffusion area, the first buffer layer having a refractive index equal to or higher than a refractive index of the substrate; and etching the substrate to form a groove at a portion of the substrate corresponding to an outside of a bend of the bent portion along the diffusion area.

The other objects, features, and advantages of the present invention are specifically set forth in or will become apparent

DETAILED DESCRIPTION OF THE PREFERRED EMBODIMENTS

Exemplary embodiments according to the present invention will be described in detail with reference to the accompanying drawings. An optical waveguide according to the present invention has a configuration in which a width and a position of a buffer layer are set in consideration of a width and a position of the optical waveguide.

Figure 1:
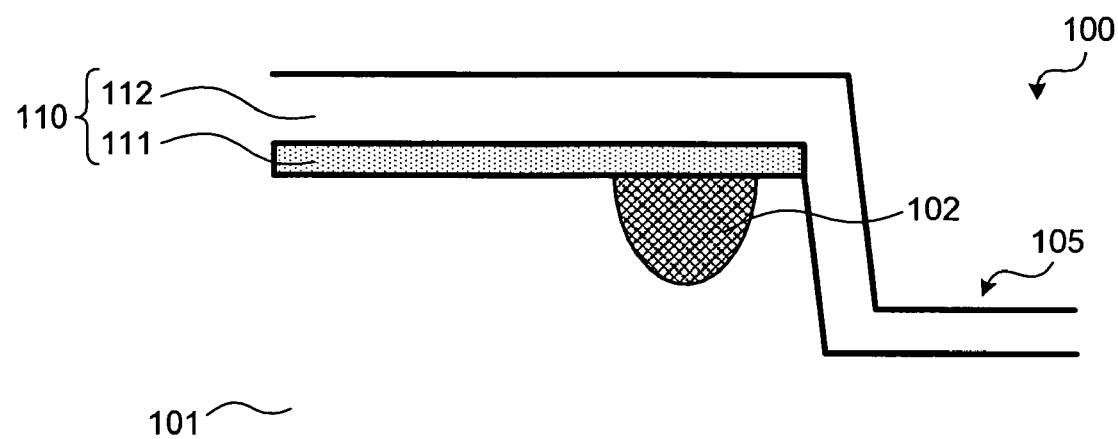
FIG. 1 is a plan view of an optical waveguide according to a first embodiment of the present invention.

FIG. 1 is a plan view an optical waveguide according to a first embodiment of the present invention. An optical waveguide 100 shown in FIG. 1 includes a bent portion as is the case of a conventional technology. On a substrate 101, a diffusion area 102, which is referred to as an optical waveguide for convenience, is formed by diffusing an impurity such as Ti. The optical waveguide 102 is formed in a linear shape with a predetermined pattern width and this pattern width is, for example, substantially 5 μm to 10 μm.

At a portion outside a bent of the bending portion of the optical waveguide 102, a groove 105 is arranged that is formed by etching along the bending of the optical waveguide 102. The substrate 101 may be a dielectric substrate such as a Z-cut LN substrate (LiNbO$_3$). A buffer layer 110 contacting the substrate 101 is formed with a material having a refractive index at substantially the same level as or higher than that of the substrate 101. By increasing an amount of light leaking into the buffer layer 110, the confinement of the light can be enhanced in the optical waveguide 102.

The buffer layer 110 shown in FIG. 1 is arranged on top of the optical waveguide 102 and includes a first buffer layer (buffer layer 1) 111 formed with a film of TiO$_2$ with a substantially uniform thickness, and a second buffer layer (buffer layer 2) 112 having a low refractive index formed on the entire surface of the substrate 101 where the optical waveguide 102 is arranged. The refractive index of TiO$_2$ used for the buffer layer 1 (111) is approximately 2.3, which is higher than that of a material of the substrate 101. The material of the buffer layer 1 (111) may be Ta$_2$O$_5$, LiNbO$_3$, or LiTaO$_3$, instead of TiO$_2$.

The buffer layer 2 (112) is formed by a material having a refractive index lower than the material of the substrate 101, such as SiO$_2$ (refractive index, 1.5). The buffer layer 2 (112) is also formed on a surface of sides of the optical waveguide 102 in accordance with the shape of the groove 105 as shown.

The buffer layer 110 may be formed only with the buffer layer 1 (111) and the light can be confined in the optical waveguide 102 only with the buffer layer 1 (111). By forming the buffer layer 1 (111) only on top of the optical waveguide 102 and forming the buffer layer 2 (112) on the entire surface of the substrate 101 including a surface on the buffer layer 1 (111), the buffer layer 2 (112) having a low refractive index is also arranged on the surface of sides of the groove 105 and a light loss can be reduced. If the wavelength of the propagated light is a single mode, the width of the buffer layer 1 (111) should be a width capable of confining the light in the single mode, for example, 5 μm to 10 μm.

Figure 2:
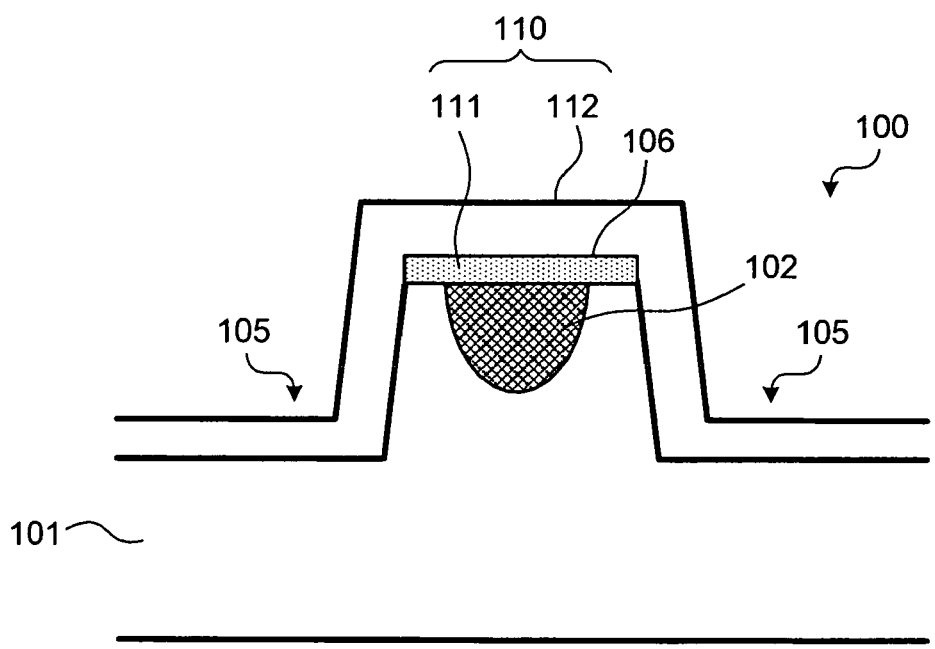
FIG. 2 is a plan view of another optical waveguide according to the first embodiment.

FIG. 2 is a plan view of another optical waveguide according to the first embodiment. A difference from the example shown in FIG. 1 is that the grooves 105 are formed on both sides of the optical waveguide 102 by etching, etc. Therefore, a convex ridge portion 106 is formed and the optical waveguide 502 is arranged in the ridge portion 106.

It is desirable that the depth of the groove 105 in the examples shown in FIGS. 1 and 2 is substantially equal to or more than 5 μm in consideration of a mode field diameter of the light. The confinement is improved if the buffer layer 1 (111) becomes thicker, however, if the buffer layer 1 (111) is too thick, the buffer layer 1 (111) acts as a core of an optical fiber and the electro-optic effect of the substrate 101 can not be acquired. To prevent this problem, a desirable thickness of the buffer layer 1 (111) is substantially 0.1 μm to 1 μm.

Although TiO$_2$ of the buffer layer 1 (111) may be provided on the entire surface of the wafer (substrate 101), if the buffer layer 1 (111) is arranged also at the end faces of the optical waveguide 102, the light loss may be increased due to the combination with the optical fiber. Therefore, a pattern is formed such that the buffer layer 1 (111) remains only on necessary portions such as bent portions. Since the light loss at the bent portion becomes significant when a curvature radius is small, for example, equal to or less than 3 millimeters (mm), the buffer layer 1 (111) may be arranged on the optical waveguide 102 only at the bent portions that have a curvature radius substantially equal to or less than 3 mm.

Figure 3:
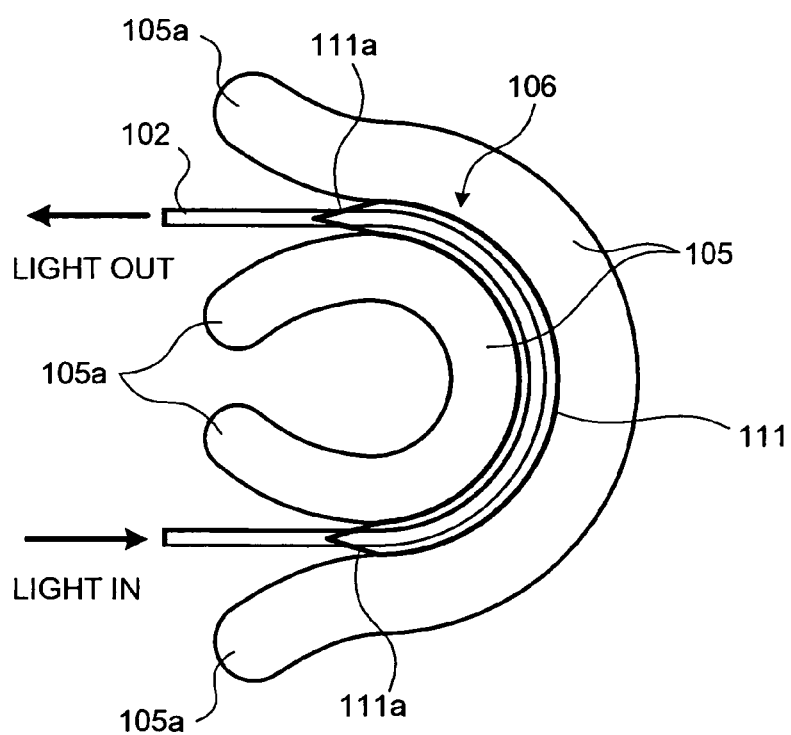
FIG. 3 is a plan view of a buffer layer 1.

FIG. 3 illustrates a pattern of the buffer layer 1. The buffer layer 1 (111) is formed with TiO$_2$, etc., and is formed in a bent area of the optical waveguide 102. That is, a pattern is formed in an area between a position (start position) where a bend of the optical waveguide 102 starts and a position (end position) where the bend ends. Mode fields are different between the portion with the buffer layer 1 (111) of TiO$_2$, etc., and the portion without the buffer layer 1 (111). Therefore, as shown in FIG. 3, the bending start position and the end position of the pattern of the buffer layer 1 (111) are formed as tapered portions 111a such that a width is decreases toward the ends. By forming the tapered portions 11a in the buffer layer 1 (111), the light loss can be prevented from being generated due to scattering at the start position (and the end position) of the buffer layer 1 (111) and the distribution of the light can be changed in the optical waveguide 102 to confine the light in the optical waveguide 102.

In the example shown in FIG. 3, the groove 105 is formed not only at the portion outside the bend of the bent portion but also on a portion inside the bend of the bent portion of the optical waveguide 102. In other words, on both sides of the optical waveguide 102, the groove 105 is formed. The groove 105 is formed not only at the bent portion but also at a part of a linear portion for a predetermined length. In a similar manner, the ridge portion 106 is relatively formed by forming the grooves 105 extends from the bent portion to the linear portion. In the example shown in FIG. 3, the end 105a of the groove 105 is formed such that the groove 105 is gradually directed outward away from the linear portion of the optical waveguide 102 as the groove 105 departs from the start position (and the end position) of the bend. Therefore, the coupling loss (light loss) can be reduced at the coupling portion of the linear portion and the bent portion of the optical waveguide 102.

FIGS. 4A to 4E are schematics of various patterns of the buffer layer 1. FIGS. 4A to 4E illustrate enlarged views of the start position (or the end position) of the buffer layer 1 (111) shown in FIG. 3. The patterning of the buffer layer 1 (111) can be disposed such that a width W3 and s position of the buffer layer 1 (111) are relatively identical to or different from a width W1 and a position of the ridge portion 106 (or a width W2 and a position of the optical waveguide 102 formed by diffusion).

Figure 4A:
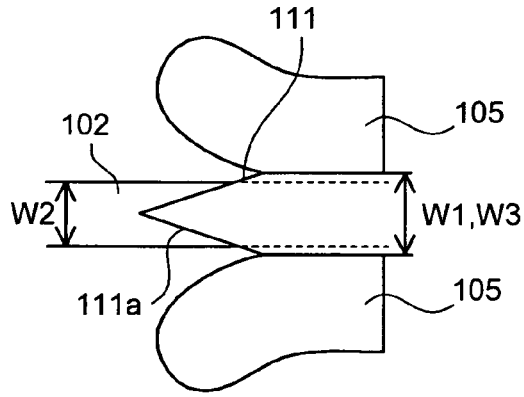
FIGS. 4A to 4E are schematics for illustrating formation of various patterns of the buffer layer 1.
Figure 4B:
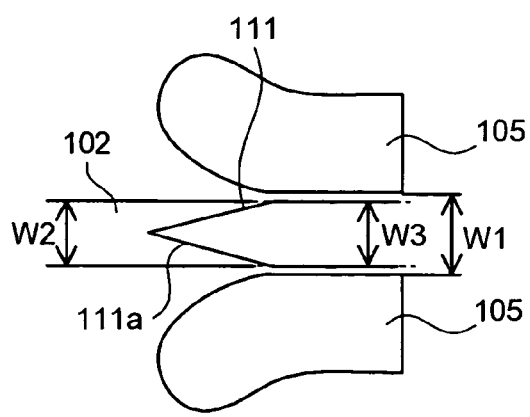
Figure 4C:
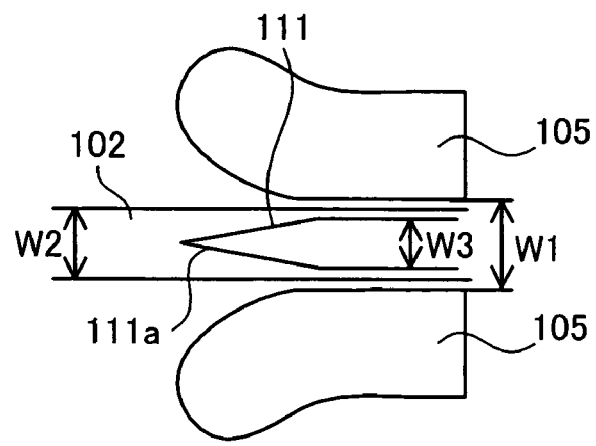

In an example shown in FIG. 4A, the width W3 of the buffer layer 1 (11) is made substantially identical to the width W1 of an upper surface of the ridge portion 106. In an example shown in FIG. 4B, the width W3 of the buffer layer 1 (111) is smaller than the width W1 of the ridge portion 106. The width W3 of the buffer layer 1 (111) is made substantially identical to the width W2 of the optical waveguide 102. In an example shown in FIG. 4C, the width W3 of the buffer layer 1 (111) is smaller than the width W1 of the ridge portion 106. The width W3 of the buffer layer 1 (111) is smaller than the width W2 of the optical waveguide 102. In the formations of FIGS. 4A to 4C, a center position of the bend of the buffer layer 1 (111) is positioned substantially at a center position of the bent portion of the ridge portion 106 (optical waveguide 102). As shown in FIGS. 4B and 4C, by making the width W3 of the pattern of the buffer layer 1 (111) smaller than the width W1 of the ridge portion 106, the confinement can be enhanced in the lateral direction of the optical waveguide 102.

Figure 4D:
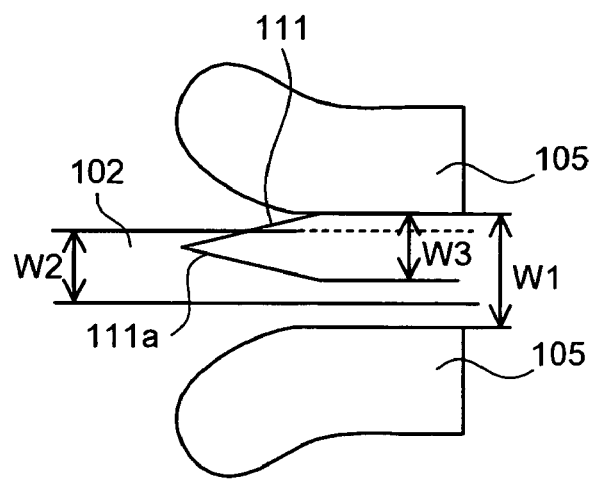
Figure 4E:
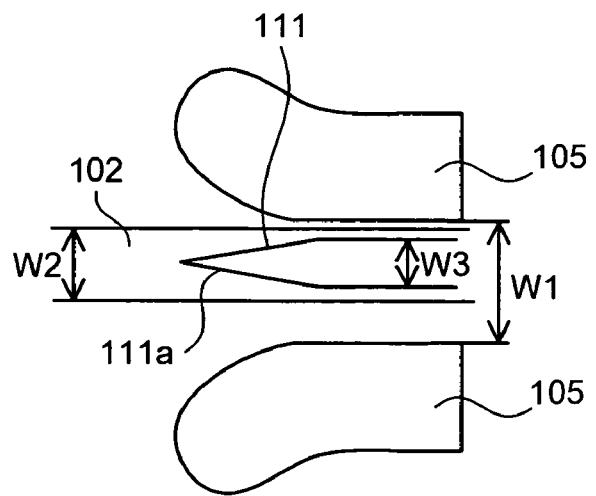

In an example shown in FIG. 4D, the width W1 of the ridge portion 106 is wider, and the buffer layer 1 (111) is formed to be shifted toward (closer to) the outside of the bend of the bent portion as shown. In other words, the center position of the buffer layer 1 (111) is formed to be shifted from the center position of the optical waveguide 102 toward the outside of the bend of the bent portion by a predetermined amount. Thus, when the width W1 of the ridge portion 106 is wider, the light loss due to the radiation of the optical waveguide 102 can be reduced as well. In an example shown in FIG. 4E, the width W1 of the ridge portion 106 is wider. The buffer layer 1 (111) is formed to be shifted along with the optical waveguide 102 toward the outside of the bend of the bent portion. The center position of the buffer layer 1 (111) is located substantially at the center position of the optical waveguide 102. Thus, when the width W1 of the ridge portion 106 is wider, the light loss due to the radiation of the optical waveguide 102 can be reduced as well. The center position of the optical waveguide 102 may be shifted outward or inward relative to the center position of the ridge portion 106.

In the examples shown in FIGS. 4A to 4E, a mask for etching is provided such that one end (start position) of the pattern of the buffer layer 1 (111) is matched with one end (start position) of the ridge portion 106. As a result, when the substrate 101 is etched with the use of the mask, the buffer layer 1 (111) can be etched simultaneously along with the ridge portion 160 relatively formed by forming the grooves 105. Therefore, the displacement of the ridge portion 106 and the buffer layer 1 (111) does not generated and the effect of the displacement of the mask can be prevented.

Figure 5:
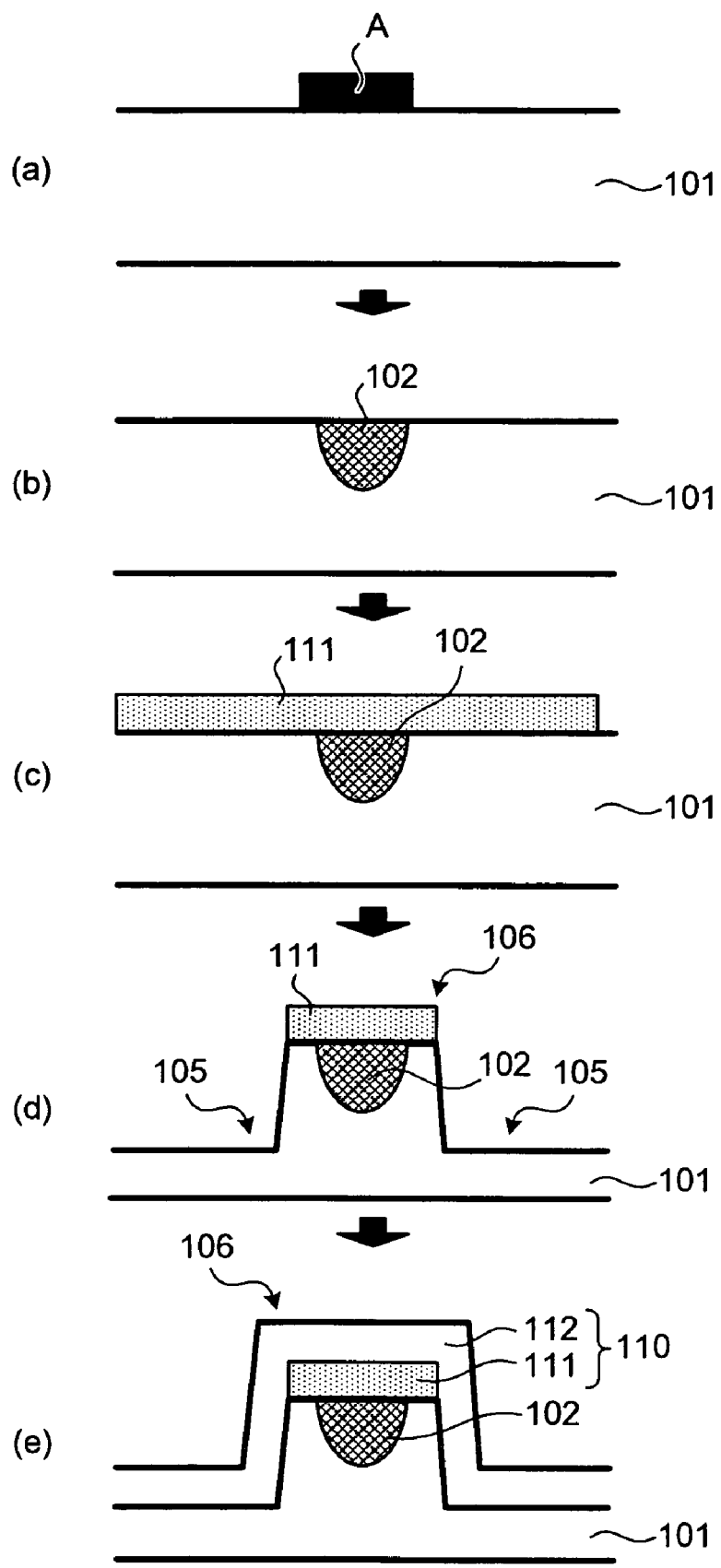
FIG. 5 is a schematic for illustrating a manufacturing process of the optical waveguide.
Figure 6:
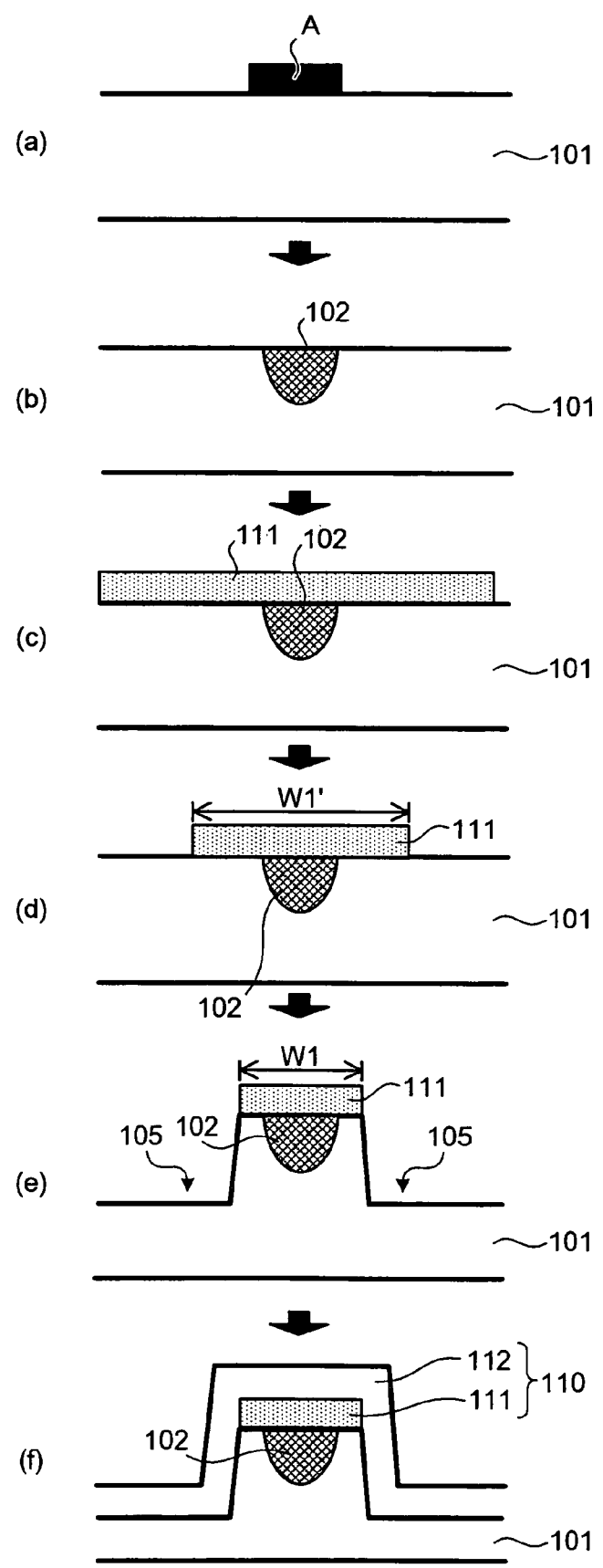
FIG. 6 is a schematic for illustrating another manufacturing process of the optical waveguide.

FIG. 5 is a schematic for illustrating a manufacturing process of the optical waveguide. Description will be made of an example of the manufacturing processes when the ridge portion 106 shown in FIG. 2 is formed. First, (a) a metallic film A such as Ti is formed as a pattern on the surface of the substrate 101 such as the LN substrate. (b) The metallic film A made from an impurity is diffused at a high temperature to form a diffusion area (optical waveguide) 102. (c) The buffer layer 1 (111) made from a material having a refractive index higher than the substrate 101 such as $TiO_2$ is formed on the entire surface of the substrate 101. (d) The buffer layer 1 (111) and the substrate 101 are etched at the same time to form the grooves on both sides of the optical waveguide 102 (the ridge portion 106 is relatively formed in a concave shape). Therefore, the buffer layer a (111) is formed so as to remain on the ridge portion 106. (e) The buffer layer 2 (112) is formed with a film having a low refractive index such as $SiO_2$ from the surface of the substrate 101. At the process shown in a diagram (b) in FIG. 5, the optical waveguide 102 may be formed by performing proton exchange in benzoic acid instead of the thermal diffusion of Ti.

FIGS. 6A to 6F are schematics for illustrating a manufacturing process of the optical waveguide. This is an example when the material used for the buffer layer 1 (111) is, instead of $TiO_2$, a highly refractive material that cannot be dry-etched as described above. Processes shown in diagrams (a) to (c) in FIG. 6 are performed similarly as the example shown in FIG. 5. (d) The material used for the buffer layer 1 (111) is trimmed by the wet etching. The buffer layer 1 (111) is formed by the wet etching with a width W1', which is somewhat wider than the width W1 of the ridge portion 106 to be acquired by forming the grooves 105 at a process shown in a diagram (e) in FIG. 6.

(e) The substrate 101 is dry-etched to form the grooves 105 on the both sides of the optical waveguide 102 (the ridge portion 106 is relatively formed in a concave shape). (e) The buffer layer 2 (112) is formed with a film with a low refractive index such as $SiO_2$ from the surface of the substrate 101. As shown in the diagrams (d) in FIG. 5 and a the diagram (e) in FIG. 6, by etching the buffer layer 1 (111) and the substrate 101 in one process at the same time, the displacement of the ridge portion 106 and the buffer layer 1 (111) does not generated and the effect of the displacement of the mask can be prevented.

Figure 7A:
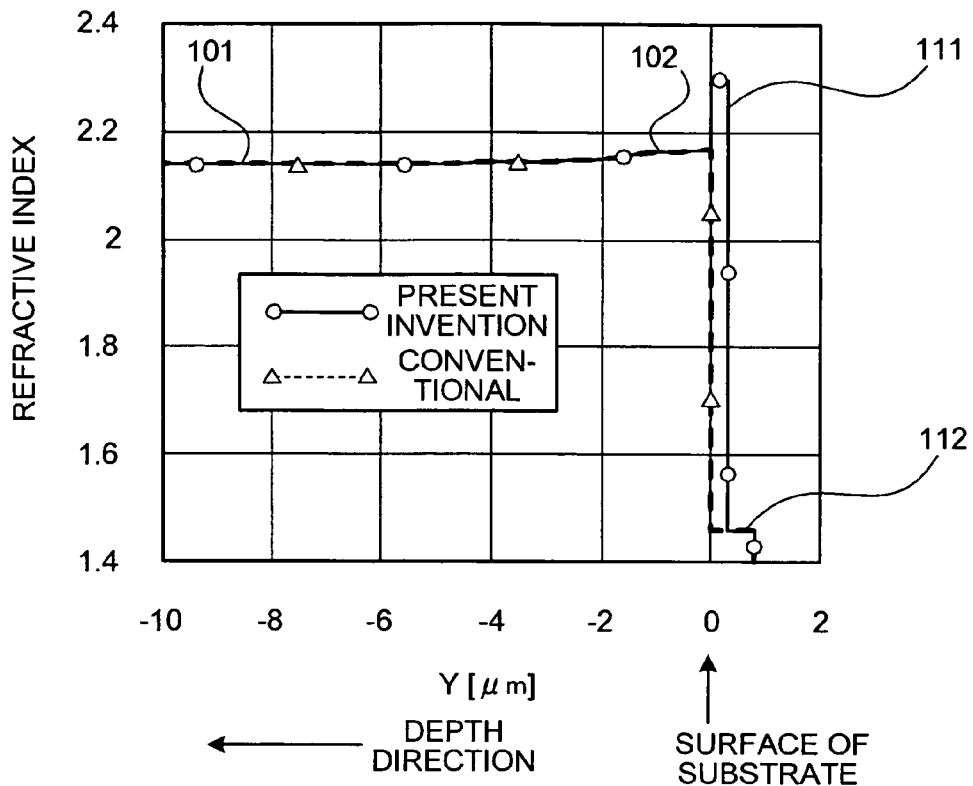
FIG. 7A is a chart of refractive index distribution.

FIG. 7A illustrates refractive index distribution. The horizontal axis represents thickness Y of the substrate 101 (negative direction is the depth direction of the substrate) and the vertical axis represents the refractive index. In the refractive index distribution of a conventional configuration (without buffer layer 1), the refractive index is highest at the Ti diffusion portion (optical waveguide 102) near the surface of the substrate 101 and drastically decreases at the buffer layer 2 (112) portion. On the other hand, in the present invention with the above configuration, the buffer layer 1 (111) is arranged between the Ti diffusion portion (optical waveguide 102) and the buffer layer 2 (112), and the buffer layer 1 (111) has a refractive index higher than the Ti diffusion portion (optical waveguide 102).

Figure 7B:
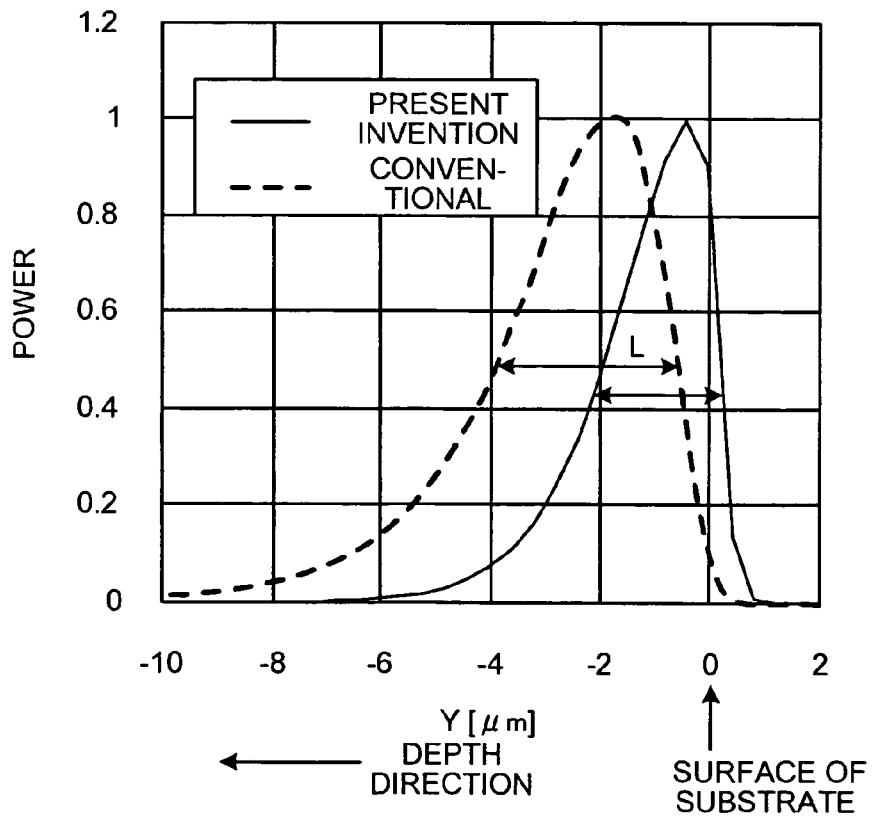
FIG. 7B is a chart of light power distribution.

FIG. 7B illustrates light power distribution. The horizontal axis represents thickness Y of the substrate 101 (negative direction is the depth direction of the substrate) and the vertical axis represents the light power. By disposing the buffer layer 1 (111), the light power distribution is concentrated near the surface as compared to the conventional case, and a half-value width is reduced from 3.4 μm to 2.2 μm. As a result, the confinement of the light in the optical waveguide 102 can be enhanced (the mode field can be narrowed) to realize the optical waveguide 102 that can be bent even when a curvature radius is small.

Figure 8:
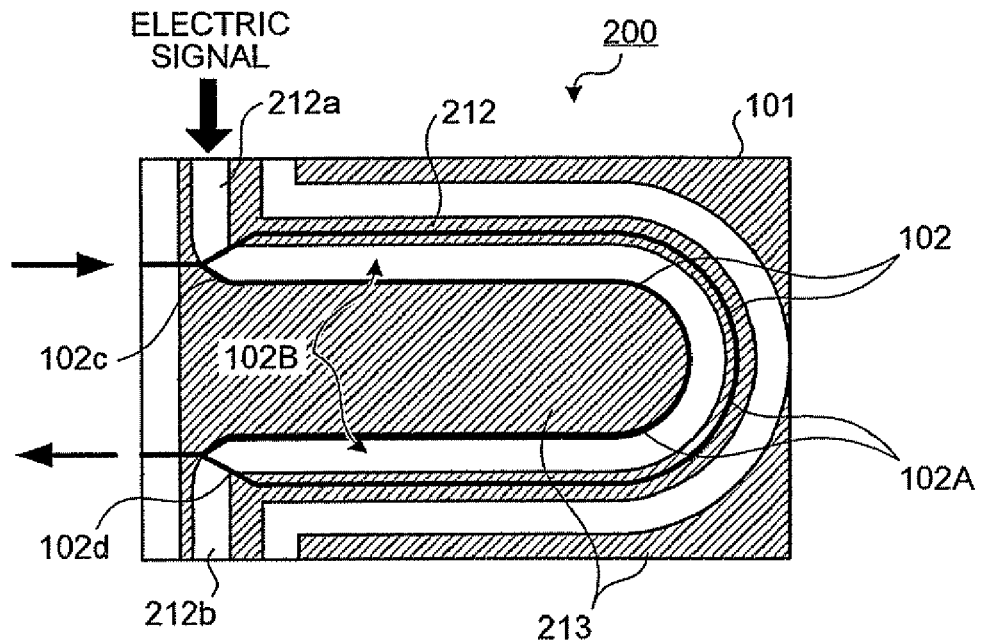
FIG. 8 is a schematic of an optical modulator according to a second embodiment of the present invention.
Figure 9A:
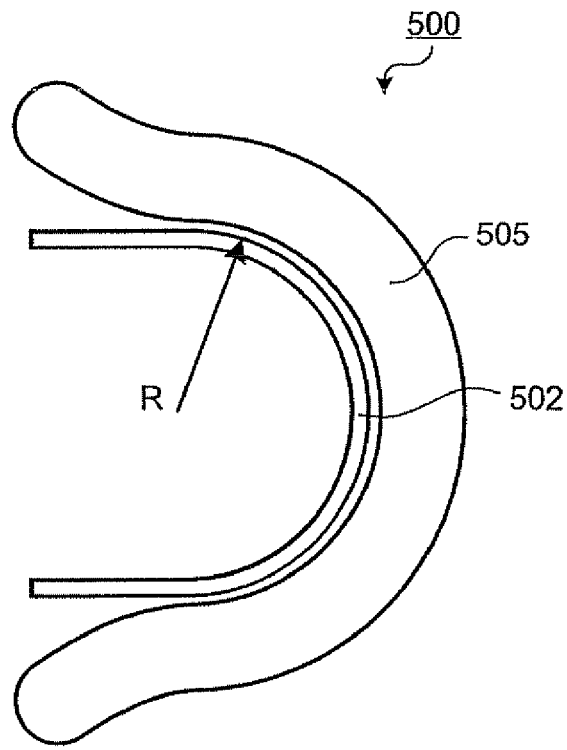
FIG. 9A is a plan view of a conventional bent waveguide.
Figure 9B:
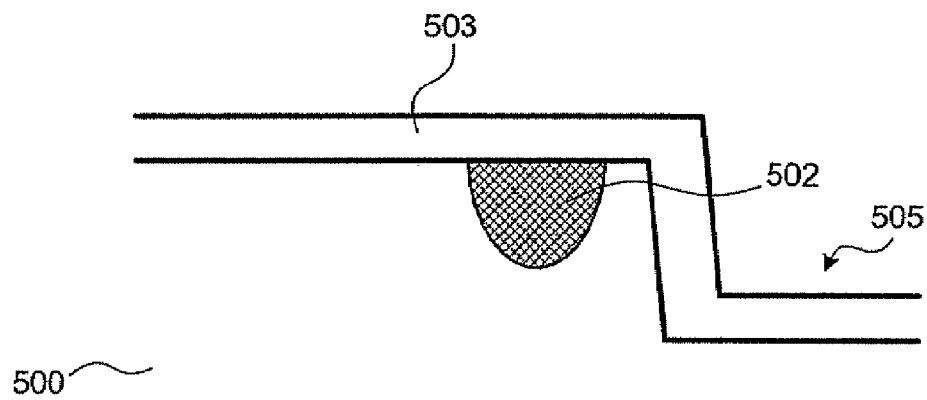
FIG. 9B is a cross-section of the conventional bent waveguide.
Figure 10A:
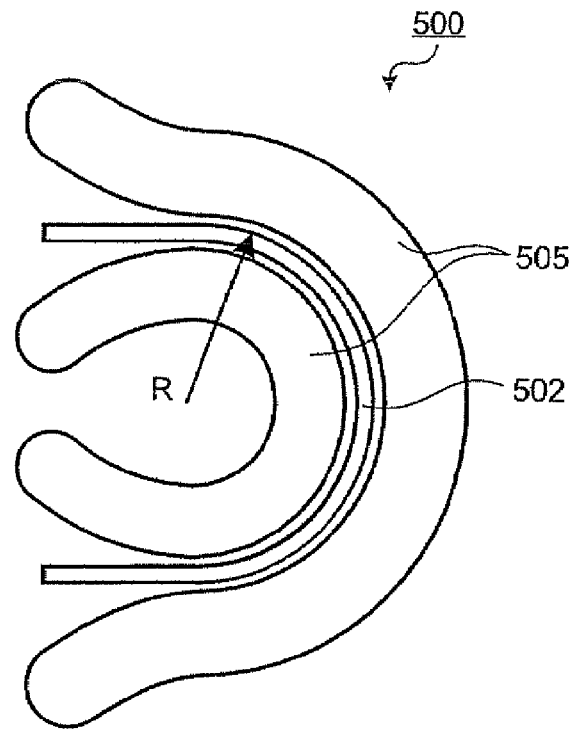
FIG. 10A is a plan view of another conventional bent waveguide.
Figure 10B:
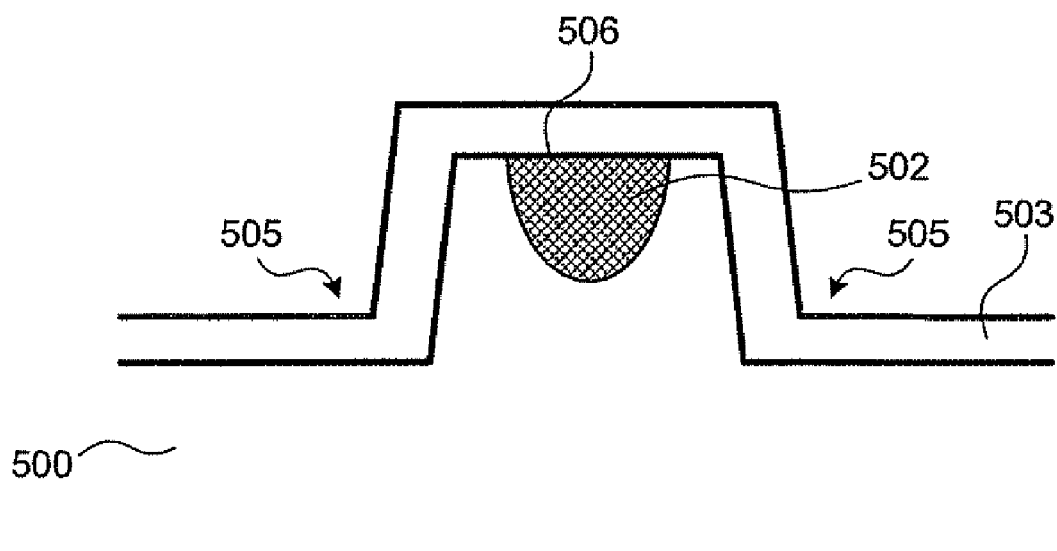
FIG. 10B is a cross-section of the other conventional bent waveguide.

In a second embodiment of the present invention, description will be made of a specific example when the optical waveguide described in the first embodiment is applied to an optical device. The optical devices include optical modulators and optical switches. FIG. 8 is a schematic of an optical modulator according to the second embodiment. FIG. 8 illustrates a Mach-Zehnder interference type optical modulator in which a bent portion is formed at a portion of the optical waveguide.

A signal line 212, signal electrodes 212a and 212b, and a ground electrode 213 are formed on the substrate 101 of an optical modulator 200 shown in FIG. 8. The signal line 212 has a length that satisfies a working length (L0) necessary for generating a phase difference and has a portion that is bent to form a substantially U-shaped bent portion. The optical waveguides 102 are disposed along the signal line 212, and branching portions 102c and 120d are formed at portions overlapping the signal line 212. Two optical waveguides 102 are disposed in parallel between the branching portions 102c and 120d, As described in the first embodiment, the optical waveguide 102 has a bent portion 102A and a linear portion 102B, and the bent portion 102A and the linear portion 102B are interaction portion of light and microwave.

At least in the bent portion 102A of the optical waveguide 102, by disposing the buffer layer 110 described in the first embodiment, the light can be contained within the bent portion 102A of the optical waveguide 102 to reduce the light loss due to the radiation from the bent portion 102A. In accordance with the optical modulator 200, by disposing the bent portion 102A formed by 180-degree turnaround of the optical waveguide 102, a length can be shortened in the lateral direction of FIG. 8 to achieve miniaturization of the optical modulator 200.

In the optical modulator 200 shown in the second embodiment, the signal line 212 and the signal electrodes 212a and 212b are arranged on the optical waveguide 102. If the buffer layer 110 is constituted only by the buffer layer 1 (111) in such a configuration, the optical mode reaches the electrodes and is absorbed by the electrodes, resulting in increase of the light loss. Therefore, in the buffer layer 110, the buffer layer 1 (111) having a high refractive index is combined with the buffer layer 2 (112) having a low refractive index, which is formed on the buffer layer 1 (111). Since the buffer layer 2 (112) is formed on the entire surface of the substrate 101 and, thereby being formed on the side surfaces of the groove (or ridge portion) formed along the sides of the optical waveguide 102, increase of the light loss can be prevented.

The optical waveguide 102 of the optical device described in the second embodiment has been described as an example of a substantially U-shaped configuration including one 180-degree turnaround. When one turnaround is disposed in the optical waveguide 102 as shown in FIG. 8, the light input portion and the light output portion of the optical waveguide 102 are disposed on the same side of the optical device. The optical waveguide 102 may have a substantially S-shaped configuration including two 180-degree turnarounds or may have three or more turnarounds. By increasing the number of turnarounds of the optical waveguide 102, the working length (L0) can be made long and the variable area of the phase difference can be increased. When including the even number of turnarounds, the light input portion and the light output portion of the optical waveguide 102 are disposed on the different sides of the optical device.

While the Mach-Zehnder interference type optical modulator 200 has been described in the second embodiment, the optical waveguide 102 can also be applied to a phase modulator. The phase modulator is different from the optical modulator 200 only in that the phase modulator is constituted by one optical waveguide 102 without a branching portion. In the optical waveguide 102 disposed in such a phase modulator, the light loss can be constrained to achieve miniaturization by disposing the buffer layer (110) at the bent portion 102A.

The optical waveguide 102 described in each embodiment can be applied not only to the phase modulator and the optical modulator but also to other optical devices such as optical switches to constrain the light loss in these optical devices and to achieve miniaturization of apparatuses.

According to the embodiments described above, it is possible to prevent 0a light loss and to achieve miniaturization of an optical waveguide and an optical device.

What is claimed is:

1. An optical device, comprising:
   a substrate;
   an optical waveguide on the substrate;
   a groove on the substrate along a bent portion of the optical waveguide;
   a first buffer layer on the optical waveguide; and
   a second buffer layer formed with a film on the first buffer layer, wherein:
   the first buffer layer has a refractive index higher than a refractive index of the substrate, and
   the second buffer layer has a refractive index lower than the refractive index of the substrate.

2. The optical device according to claim 1, wherein the second buffer layer contacts a side face of the groove.

3. The optical device according to claim 1, wherein a radius of curvature of the bent portion is 3 millimeters or less.

4. The optical device according to claim 1, wherein the first buffer layer is made of titanium oxide ($TiO_2$).

5. The optical device according to claim 1, wherein the first buffer layer is made of tantalum oxide ($Ta_2O_5$).

6. The optical device according to claim 1, wherein the substrate is made of lithium niobate ($LiNbO_3$).

7. The optical device according to claim 1, wherein a width of the optical waveguide is approximately 5 micrometers to 10 micrometers in length.

8. The optical device according to claim 1, wherein the first buffer layer is made of lithium niobate ($LiNbO_3$).

9. The optical device according to claim 1, wherein the first buffer layer is made of lithium tantalate ($LiTaO_3$).

10. The optical device according to claim 1, wherein the first buffer layer is formed only at the bent portion.

11. The optical device according to claim 1, wherein a depth of the groove is equal to or larger than substantially 5 micrometers.

12. The optical device according to claim 1, wherein a thickness of the first buffer layer is substantially 0.1 micrometer to 1 micrometer.

13. The optical device according to claim 1, further comprising a signal electrode arranged on the optical waveguide.

14. The optical device according to claim 1, wherein the optical waveguide is formed by diffusing impurity on the substrate.

15. The optical device according to claim 1, wherein the groove is formed by etching the substrate.

16. The optical device according to claim 14, wherein the impurity includes titanium (Ti).

17. The optical device according to claim 14, wherein the optical waveguide is formed by performing proton exchange on the impurity.

18. A method of manufacturing an optical device that includes an optical waveguide formed by diffusing impurity on a substrate, the method comprising:

forming a first buffer layer on the optical waveguide, the first buffer layer having a refractive index higher than a refractive index of the substrate; and etching the substrate along a bent portion of the optical waveguide to form a groove; and forming a second buffer layer formed with a film on the first buffer layer, the second buffer layer having a refractive index lower than the refractive index of the substrate.

19. The method according to claim 18, wherein the second buffer layer is formed so as to be in contact with a side face of the groove.

20. The method according to claim 18, wherein the etching includes etching the first buffer layer and the substrate at the same time.

21. A method of manufacturing an optical device that includes an optical waveguide formed by diffusing impurity on a substrate, the method comprising:

forming a first buffer layer on the optical waveguide, the first buffer layer having a refractive index higher than a refractive index of the substrate;

etching the substrate along a bent portion of the optical waveguide to form a groove; and forming a second buffer layer on the first buffer layer, the second buffer layer having a refractive index lower than the refractive index of the substrate, wherein:

the etching comprises etching the first buffer layer and the substrate at the same time.

* * * * *